United States Patent Office 3,289,934
Patented Dec. 6, 1966

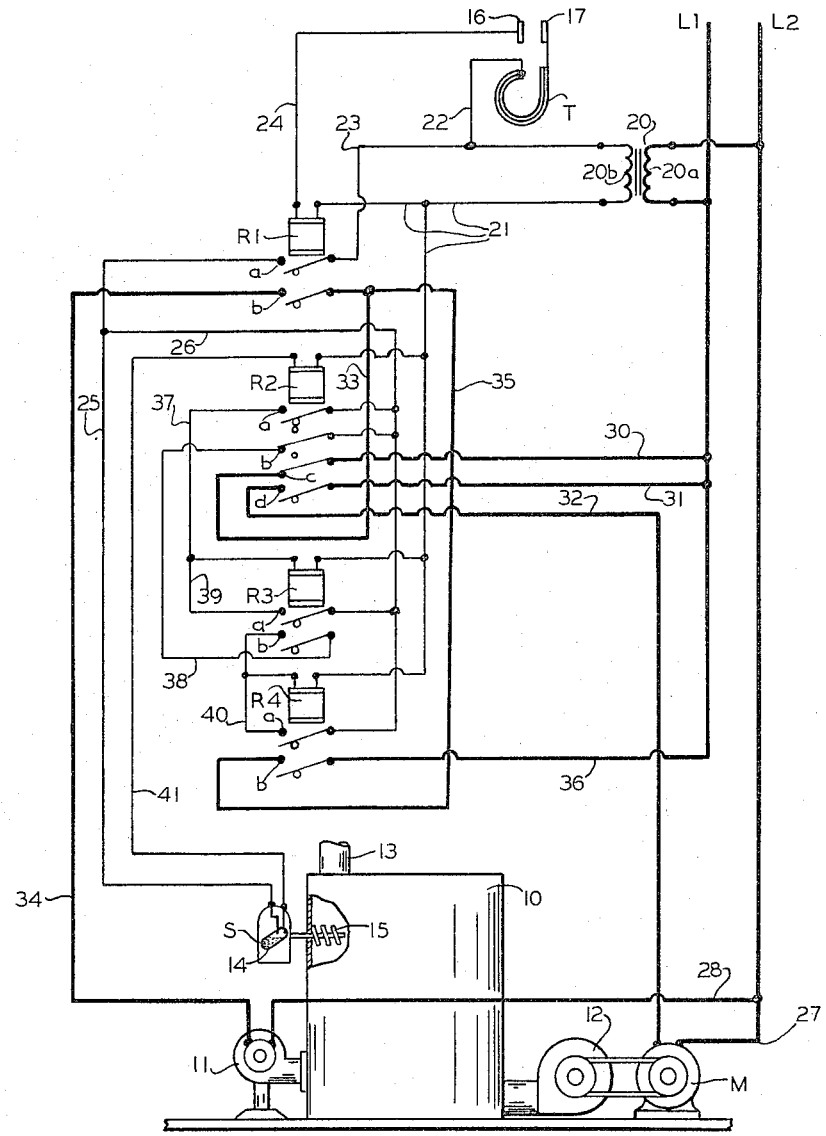

3,289,934
WARM AIR HEATING SYSTEM CONTROL
Abraham R. Baroody, 7 Sherrill St., Geneva, N.Y.
Filed May 6, 1965, Ser. No. 453,718
4 Claims. (Cl. 236—9)

This invention relates to controls for a heating system and more particularly to a temperature control system for a warm air furnace having an electrically controlled burner and an electrically operated blower for circulating the air from the furnace to the space to be heated.

The usual type of control system has a room thermostat centrally located in the space to be heated for calling for heat when the room temperature drops. When the thermostat contacts close, the burner operates until the furnace heats up sufficiently to operate a thermostatically controlled switch in the bonnet of the furnace. When the bonnet switch closes the blower is activated and both burner and blower operate until the thermostat contacts open again by reason of a temperature rise in the space to be heated.

After the opening of the thermostat contacts the furnace frequently retains sufficient heat to cause the bonnet switch to remain closed and the consequent continued operation of the blower which forces more heated air to the space to be heated. This "over-running" results in overheating the area where the thermostat is located.

A co-pending application Ser. No. 340,289, by the same inventor, filed Jan. 27, 1964, shows a system of controls to eliminate the "over-running" of the blower by the use of a plurality of relays which control a system of circuits for operating the burner and the blower alternately so long as the thermostat contacts remain closed. The difficulty with this system is that in certain instances, during very cold weather or where the existing furnace has limited capacity, the alternate operation of blower and burner results in the space being heated too slowly.

Accordingly, the principal object of the present invention is to provide controls which will, for an initial period, operate the burner and blower alternately but then, should the thermostat continue to call for heat, to provide a second period during which the burner is operated continuously so long as the thermostat contacts remain closed while the blower operates only at the intervals during which the bonnet switch contacts remain closed.

Another important object is to provide a control system with the minimum number of thermostatically operated contacts for preventing the overheating of the space to be heated and at the same time providing for heating this space in the minimum of time during periods of maximum demand for heat.

Further objects are to provide such a system which is easy and economical to install and maintain, which is dependable in operation, and which is safe and positive in operation.

Other objects and advantages will become apparent from the following description in conjunction with the accompanying drawing, in which:

The single drawing figure is a diagrammatic view of a furnace and heating system with controls for operating in accordance with the invention.

In the drawing the furnace 10 has a burner 11, for heating air in the bonnet or upper portion of the furnace, and a blower 12 for circulating air through the furnace and through appropriate ducts, such as the duct 13 to the space to be heated. Blower 12 is driven by an electric motor M, but for convenience the combination blower and motor will be hereinafter referred to as the blower.

Burner 11 is represented as an oil burner but it may be any other electrically controlled means for heating the air in the furnace.

A bonnet switch S is represented as a mercury switch 14 thermostatically operated by the bi-metal control portion 15, but it will be apparent that it may be any thermostatically operated switch having a pair of contacts adapted to close when the bonnet reaches a predetermined temperature and to open again when the bonnet temperature falls to another predetermined temperature.

In the space to be heated, a thermostat T is represented as having a pair of spaced contacts 16 and 17 arranged so as to close when temperature at T falls below a preselected temperature and to open again when the temperature rises to the selected level.

A source of electric current is represented by the wires L1 and L2 and a transformer 20, having its primary winding 20a connected to the line wires. Its secondary winding 20b is adapted for furnishing current at less than line voltage for the control circuits which are represented by lines lighter than the comparatively heavy lines of the line voltage circuits.

One terminal of the winding 20b is connected by a wire 21 to one coil terminal of each of the relays R1, R2, R3 and R4. The other terminal of winding 20b is connected by a wire 22 to contact 17 of the thermostat T and by another wire 23 to one contact of a pair of normally open contacts R1a of relay R1. The other thermostat contact 16 is connected by wire 24 to the second terminal of relay R1. The circuit comprising transformer 20, wire 22, contacts T16 and 17, wire 24, relay R1, and wire 21 to transformer may be termed the primary control circuit.

The other contact of the pair of contacts R1a is connected by a wire 25 to one contact of the bonnet switch S and by a wire 26 to various contacts of relays R2, R3, and R4, as hereinafter described, to establish secondary control circuits. The other contact of the bonnet switch S is connected by a wire 41 to the second coil terminal of the relay R2.

Relay R1 has another pair of normally open contacts R1b, and relay R2 has four pairs of contacts R2a, R2b, R2c and R2d, R2a and R2d being normally open and the other two pairs being normally closed. Relays R3 and R4 each have two pairs of normally open contacts, R3a and R3b, and R4a and R4b respectively.

Line wire L2 is connected by a wire 27 to the motor M of the blower 12 and by a wire 28 to the controls of the burner 11. Line wire L1 is connected by a wire 30 to one contact of the normally closed pair of contacts R2c, and by a wire 31 to one contact of the normally open pair R2d.

The other contact of the pair R2d is connected by wire 32 to the blower and the other contact of the pair R2c is connected by a wire 33 to one contact of the pair R1b. The other contact of the pair R1b is connected by wire 34 to the other side of burner 11.

The contact of the pair R1b which is connected by wire 33 to contact R2c, is also connected by wire 35 to a contact of the pair R4b to establish an alternate circuit to the burner as will appear, the other contact of the pair R4b being connected by wire 36 to line wire L1.

Wire 26, described above as part of various secondary control circuits, is connected to one contact each of the pairs R2a, R2b, R3a and R4a. The other contacts of these pairs are connected, respectively: R2a by wire 37 to the second terminal of relay coil R3; R2b by a wire 38 to one contact of the pair R3b; R3a by a wire 39 to wire 37; and R4a by a wire 40 to the second terminal of R4 and also to the other contact of the pair R3b.

It will now be apparent that the relay R1 is operated by the primary control circuit through the thermostat contacts 16 and 17 and that relay R1 is energized only so long as the contacts of thermostat T are closed to call for heat. The secondary control circuits are all conditioned through the closing of the contact pair R1a, so that R2, R3 and R4 can only be energized when R1 is energized by the closing of the thermostat contacts. Also whenever the contacts 16 and 17 open again all the relays are deenergized and the system returns to the normal conditions as shown in the drawing.

Relay R2 can only be energized by the closing of the bonnet switch contacts and whenever switch S opens again R2 will become deenergized. It will be noted that the only line circuit to the blower is from L1 to wire 31, the normally open pair of contacts R2d, wire 32, M, wire 27 and L2. Hence, when relay R2 is energized the blower is operated and when R2 is deenergized the blower is turned off.

The wire 34 is part of both line or power circuits to the burner 11 and wire 34 can only be connected to line L1 when the contacts R1b are closed. Hence, the burner can only be operated when the relay R1 is energized.

Normally, the contact pair R2c is closd, so that when R1 is first operated, closing the contact pair R1b, a line or power circuit to the burner 11 is completed from L1, wire 30, contacts R2c, wire 33, contacts R1b, wire 34, burner, wire 28 to L2. It will be noted that another line or power circuit to the burner may be completed when the relay R4 is energized. The closing of contacts R4b completes the alternate circuit L1, wire 36, contacts R4b, wire 35, contacts R1b, wire 34, burner, wire 28, and L2. Thus, even when the relay R2 is not energized by reason of the bonnet switch contacts being open the burner may operate so long as R4 and R1 are both energized.

In operation it will be evident that at whatever part of the cycle R1 is deenergized by reason of the thermostat contacts 16 and 17 opening, all control circuits will be broken because of the opening of contacts R1a. All line circuits to the burner will also be broken by the opening of contacts R1b. The line circuit to the blower will also be broken when contacts R2d open because the relay R2 is deenergized.

So long as the relay R1 is energized, however, the cycle is as follows:

First, when contacts R1b first close, the line circuit to the burner 11 through wire 30 and the normally closed contacts R2c is completed through wire 33, contacts R1b and wire 34 and the burner operates, the relay R2 not being energized because the switch S is open.

Second, when switch S closes R2 is energized by reason of the circuit: transformer 20, wire 21, R2, wire 41, S, wire 25, R1a, wire 23 and transformer. R2 being energized, contacts R2a close energizing the relay R3, the circuit being: transformer, wire 23, contacts R1a, wire 26, contacts R2a, wire 37, R3, wire 21 and transformer. Contacts R3a thereby close establishing a holding circuit by-passing contacts R2a from wire 26: contacts R3a, wire 39 and wire 37 to one terminal of R3, the other terminal still being connected in the circuit by wire 21. Contacts R3b also close but no circuit to R4 is completed since contacts R2b are now open because of the operation of R2. However, the burner goes off as contacts R2c open and the blower goes on because the contacts R2d close completing the circuit: L1, wire 31, contacts R2d, wire 32, blower, wire 27, and L2.

Third, should the switch S open again before the thermostat contacts 16 and 17 open, R2 is deenergized and the blower goes off by means of the breaking of its operating circuit at the normally open contacts R2d and the burner goes on again by reason of the contacts R2c reassuming their normally closed condition. When the contacts R2b revert to their normally closed position this time, however, R4 is energized by the circuit: transformer, wire 23, contacts R1a, wire 26, contacts R2b, wire 38, contacts R3b, wire 40, relay coil R4, wire 21 and transformer. Contacts R4b close but there is no immediate effect because the burner is already on.

Fourth, when R4 is energized a holding circuit is established by the closing of contacts R4a, the circuit being: transformer, wire 23, contacts R1a, wire 26, contacts R4a, wire 40, relay coil R4, wire 21, and transformer, thus by-passing the contacts R2b which open when relay R2 is again energized. Contacts R4b are now closed establishing the alternate circuit to the burner: L1, wire 36, contacts R4b, wire 35, contacts R1b, wire 34, burner, wire 28, and L2. Since R4 is now locked in by its holding circuit, the burner continues to operate so long as R1 is energized regardless of whether R2 is energized or not. Whether the switch S is open or closed its sole effect thereafter in the cycle is to energize or deenergize the blower by closing or opening the contacts R2d.

It will be understood that only the operating controls have been shown and described. Most furnaces are provided with a thermostatically operated limit switch either in the bonnet or at the stack. Such a limit switch, for example, can be placed in series between the burner and contacts R1b, i.e.: in wire 34, or can be placed so as to shut off all electrical power in either line L1 or L2.

It will now be apparent that there has been provided a system of controls which, during mild weather will operate the burner first and then shut off the burner and turn on the blower. This will ordinarily supply enough heated air to open the thermostat contacts. Should the thermostat contacts remain closed after one such period of the blower being on and the burner off, the furnace will continue to operate with the burner on at all times until the thermostat contacts again open. The blower will also operate during this second period but will shut off only when its effect unduly cools the furnace.

As will be apparent to those familiar with the art, the invention can be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A temperature control system for a warm air furnace having a bonnet switch responsive to the temperature of the furnace and an electrically controlled furnace and an electrically operated blower, comprising: a thermostat switch responsive to the temperature of the space to be heated; and a plurality of electrically operated switching devices, including: a first device actuated by the closing of the thermostat switch and deactivated by the opening thereof, said first device when actuated having switch means controlling all circuits to the burner and to the other devices; a second device actuated by joint actuation of the first device and the closing of the bonnet switch, said second device when activated having switch means to activate a third device, the second device also having switch means to activate the blower when the second device is activated and to deactivate the blower when the second device is deactivated, and the second device also having switch means to activate the burner when the first and second devices are both actuated; said third device having switch means for establishing a holding circuit to the third device for holding the same activated so long as the first device remains activated, and the third device also having switch means for actuating a fourth device when the second device is deactivated; said fourth device having switch means for establishing a holding circuit to the same for holding the fourth device actuated thereafter so long as the first device remains activated, the fourth device also having switch means for actuating the burner so long as the first and fourth devices remain activated; whereby when the thermostat switch first closes the burner operates until the bonnet switch closes to deactivate the burner and operate the blower, and thereafter so long as the thermostat switch remains closed when the bonnet switch opens the blower is deactivated and when the bonnet switch closes the blower is activated while the burner continues activated until the thermostat switch opens.

2. A control system for a warm air furnace having electrically controlled burner and blower means, a pair of room thermostat contacts adapted to close for calling for furnace heat, and a pair of bonnet switch contacts adapted to close when the furnace is hot and to open when it is comparatively cool, comprising: four relays, the first being energized only when the thermostat contacts are closed, and having a first pair of normally open contacts which when closed conditions a plurality of circuits, each circuit when completed operating one or another of the other relays, said first relay having a second pair of normally open contacts which when closed condition each of a pair of burner circuits which when completed turns the burner on; the second relay having four pairs of contacts and being energized when the first relay is energized and the bonnet switch contacts close and being deenergized when the bonnet switch contacts open, the second relay having a first pair of normally closed contacts and a first pair of normally open contacts which close upon the energizing of the second relay to energize the third relay when the first relay is energized; the third relay having a first pair of normally open contacts which close when the third relay is energized to complete a holding circuit to hold the third relay energized so long as the first relay is energized, the third relay having a second pair of normally open contacts which close upon the energizing of the third relay for completing a circuit to energize the fourth relay when the first relay is energized and the second relay is deenergized; the fourth relay having a first pair of normally open contacts which close to set up a holding circuit to hold the fourth relay energized so long as the first relay is energized; the second relay having a second pair of normally open contacts which complete a circuit to operate the blower each time the second relay is energized and open again when the second relay is deenergized; the fourth relay having a second pair of normally open contacts which complete a circuit to operate the burner so long as the first relay is energized; the second relay having a second pair of normally closed contacts which completes a circuit to the burner when the first relay is first energized; whereby the closing of the thermostat contacts starts the burner and thereafter when the bonnet switch contacts first close the burner goes off and the blower goes on, and when thereafter the bonnet switch contacts open the blower goes off and the burner goes on and continues on until the thermostat controls open.

3. In a warm air furnace having an electrically operated burner, an electrically operated blower, a source of electrical power, transformer means having a secondary winding, room thermostat means connected to the secondary winding and having a single pair of contacts for initiation of the operation of the burner and blower, and a thermostatically operated bonnet switch having a single pair of contacts adapted to close upon the furnace reaching a predetermined temperature and to open again upon the furnace falling below a second predetermined temperature; a control system comprising: four electrically operated switching devices, each having pairs of contacts operated by a coil connected to the secondary winding, the first device having two pairs of normally open contacts, the second having two pairs of normally open contacts and two pairs of normally closed contacts, and the third and fourth devices each having two pairs of normally open contacts; a first power circuit from the source of electrical power to the blower adapted to be completed by the closing of one of the normally open pairs of contacts of the second device; a second power circuit from the source to the burner through one of the normally closed pairs of contacts of the second device and adapted to be completed by the closing of one of the normally open pairs of contacts of the first device, the second power circuit having a by-pass connection around the said normally closed pair of contacts of the second device adapted to be completely by the closing of one of the normally open pairs of contacts of the fourth device; a first control circuit from the secondary winding to the coil of the first device adapted to be completed by the closing of the room thermostat contacts; and the following secondary control circuits each adapted to be completed only when the other pair of normally open contacts of the first device are closed; a first secondary control circuit from the secondary winding to the coil of the second device adapted to be completed upon the closing of the contacts of the bonnet switch; a second secondary control circuit from the secondary winding to the coil of the third device adapted to be completed upon the closing of the second pair of normally open contacts of the second device and having a by-pass holding connection around said second pair of normally open contacts of the second device adapted to be completed upon the closing of the first pair of normally open contacts of the third device; and a third secondary control circuit from the secondary winding to the coil of fourth device through the other normally closed pair of contacts of the second device and adapted to be completed upon the closing of the other pair of normally open contacts of the third device, said third secondary control circuit having a by-pass holding connection around the normally open and normally closed pairs of contacts of the second and third devices adapted to be completed by the closing of the second pair of normally open contacts of the fourth device.

4. In a warm air furnace having a burner, a blower and temperature controlled bonnet switch; a control system comprising: a two line source of electrical power, one line being continuously connected to said blower and burner; a room thermostat having a single pair of contacts adapted to close for calling for heating the room; a transformer connected to the two line source and having a secondary winding, one side of said secondary being connected to one side each of four relay coils, the other side of the secondary being adapted to be connected through said thermostat contacts to the other side of the first relay coil and also adapted to be connected by the closing of a first normally open pair of contacts of said first relay to a control circuit wire; the first relay having a second pair of normally open contacts one of which is connected to the burner; the second relay having a first pair of normally open contacts, a second and third pair of normally closed contacts, and a fourth pair of normally open contacts, the third and fourth relays each having a first and second pair of normally open contacts respectively; the other line source of power being adapted to be connected through the normally closed third pair of second relay contacts by the closing of the second pair of first relay contacts to the burner for operation of the burner when the thermostat first closes to call for heat, said other line source also being adapted to be connected by the normally open fourth pair of second relay contacts to the blower for establishing a circuit to operate the blower each time the second relay is energized; the control circuit wire being connected to the second relay coil through the bonnet switch so as to energize the second relay when the bonnet switch contacts close, the control circuit wire being adapted by the closing of the first normally open pair of second relay contacts to be connected to the third relay coil for energizing the third relay and also being connected through the closing of the first pair of normally open third relay contacts to the third relay coil for holding the third relay closed thereafter so long as the first relay remains energized, the control circuit wire being normally connected through the normally closed second pair of second relay contacts so as to be adapted to be connected through the closing of the second pair of normally open second pair of third relay contacts to the coil of the fourth relay so as to energize the fourth relay whenever the third relay is unenergized and also so as to be adapted to be connected to the fourth relay coil through the normally open first pair of fourth relay contacts to hold the fourth relay energized thereafter so long as the first relay remains energized; said other line source of power being adapted through the closing of the second pair of fourth relay contacts to be connected through the second pair of first relay contacts to the burner for completing a circuit to the burner and holding the burner in operation after the fourth relay has been first energized so long as the first relay remains energized; whereby each subsequent opening of the bonnet switch contacts deenergizes the second relay to cut off operation of the blower and subsequent closing of the bonnet switch contacts again establishes a circuit through the second relay fourth pair of contacts to the blower while the burner remains in operation so long as the first relay remains energized.

References Cited by the Examiner

UNITED STATES PATENTS 1,991,680  2/1935  Jones _____ 236—11
2,230,446  2/1941  Baker _____ 236—9

EDWARD J. MICHAEL, *Primary Examiner.*